United States Patent [19]  
Lee et al.

[11] Patent Number: 4,797,918  
[45] Date of Patent: Jan. 10, 1989

[54] SUBSCRIPTION CONTROL FOR TELEVISION PROGRAMMING

[75] Inventors: Lin N. Lee, Potomac; Neal D. Becker, Thurmont, both of Md.

[73] Assignee: Communications Satellite Corporation, Washington, D.C.

[21] Appl. No.: 39,824

[22] Filed: Apr. 15, 1987

Related U.S. Application Data

[63] Continuation of Ser. No. 608,671, May 9, 1984, abandoned.

[51] Int. Cl.⁴ .................. H04N 7/167; H04N 7/10
[52] U.S. Cl. ........................................ 380/20; 358/84; 358/86; 380/10
[58] Field of Search ............... 358/84, 86, 85; 380/10, 380/20

[56] References Cited

U.S. PATENT DOCUMENTS

| 2,570,209 | 10/1951 | Cotsworth, III | 380/20 |
| 3,508,005 | 4/1970 | Hamburger | 358/84 |
| 3,885,089 | 5/1975 | Callais et al. | 380/20 |
| 4,112,464 | 9/1978 | Guif et al. | 358/122 |
| 4,245,245 | 1/1981 | Matsumoto et al. | 358/122 |
| 4,484,217 | 11/1984 | Block et al. | 358/122 |
| 4,536,791 | 8/1985 | Campbell et al. | 358/122 |

Primary Examiner—Stephen C. Buczinski  
Assistant Examiner—Linda J. Wallace  
Attorney, Agent, or Firm—Sughrue, Mion, Zinn, Macpeak & Seas

[57] ABSTRACT

A method and apparatus for one-way subscription television service control which allows the subscribers to subscribe in advance to a variety of programming or to select programming oa a pay-per-view basis.

17 Claims, 1 Drawing Sheet

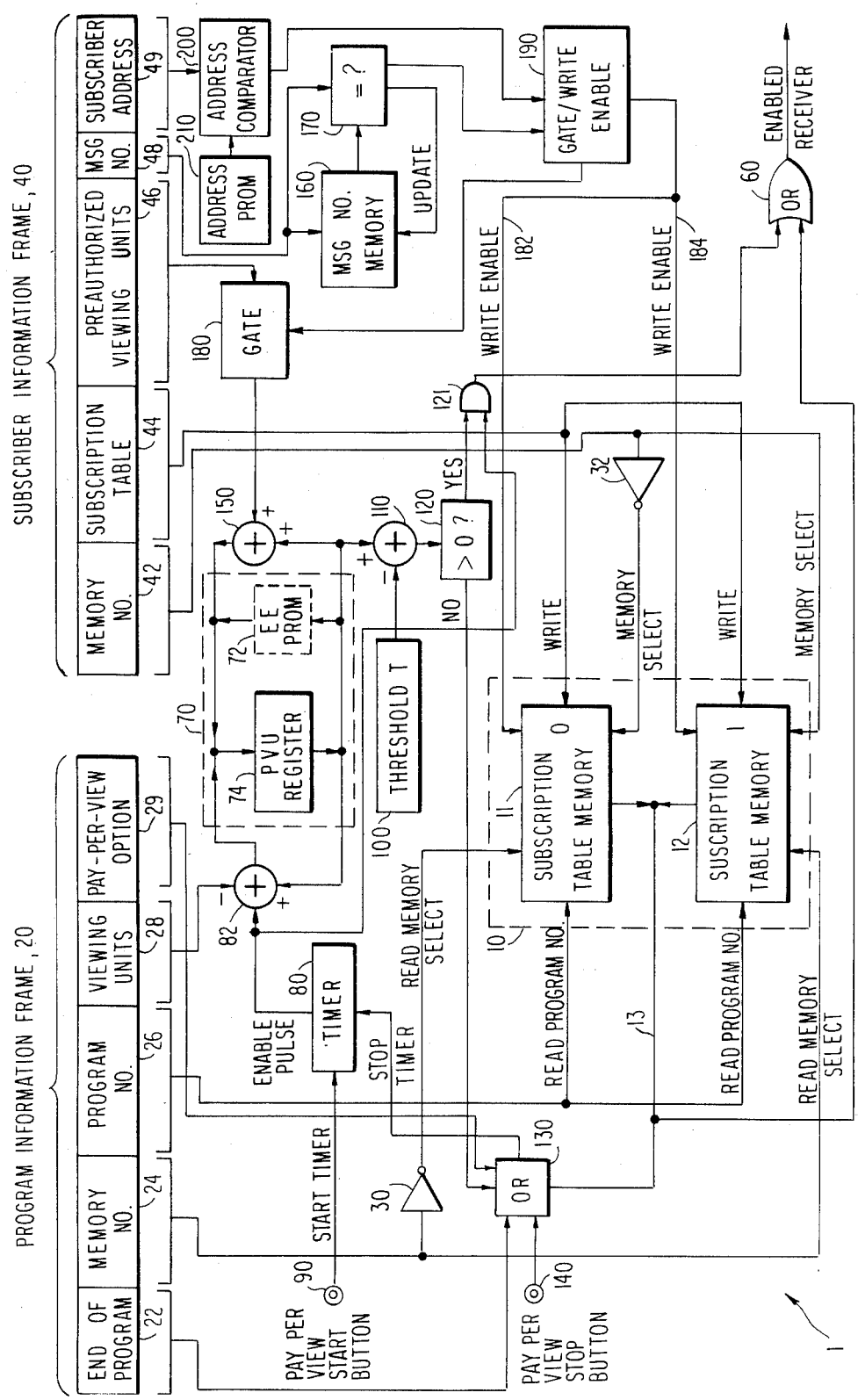

SUBSCRIPTION CONTROL FOR TELEVISION PROGRAMMING

This is a continuation of application Ser. No. 608,671, filed May 9, 1984, now abandoned.

BACKGROUND OF THE INVENTION

1. Field of the Invention

This invention pertains to subscription control of television programming which allows the subscriber to receive programming in preselected categories and programming on a pay-per-view basis. The invention is especially suitable for direct broadcast satellite (DBS) television applications.

2. DESCRIPTION OF THE PRIOR ART

Several techniques have been used in the prior art to facilitate pay-per-view operation in subscription television applications. Typically, when using such techniques, a broadcaster transmits a code identifying, with a unique address, each subscriber who has prepaid for the program. Each subscriber's control unit is enabled upon receiving the code. The control unit operates in conjunction with the subscriber's television receiver. It will be understood that when it is said herein that the control unit is enabled, the television receiver associated with such control unit also is enabled to the extent that it can receive the program. Similarly, when it is said herein that the receiver is enabled, it will be understood that the control unit associated with it has enabled it. Prior art devices, not having a memory associated with the control unit, require that each of the individual subscriber receivers must be enabled for each program. Consequently, it is necessary to enable the control units "between" different programs. For example, if viewer A subscribes to consecutive programs 1 and 2, his control unit must be enabled at the beginning of program 1 and remain enabled through the end of program 1. In addition, his control unit must be enabled to receive program 2 prior to the beginning of program 2. If viewer B subscribed to program 1 but not program 2, his control unit must be enabled prior to the beginning of program 1 and be disabled at the end of program 1 or very soon after the beginning of program 2.

In order to disable the subscriber receiving units automatically at the termination of a program, either an end-of-program message is transmitted to disable all subscriber units, or a timer, built into each subscriber's unit, is used to disable an associated subscriber unit.

This leaves a very small "window" in which time the broadcaster must transmit information to enable and disable all of those subscribers' control units.

Such prior art techniques require a high speed data channel for these addressing requirements. The prior art techniques usually are not suitable for direct broadcast satellite applications, since the very large number of subscribers would require an extremely large channel capacity for the addressing requirements. In addition, such techniques are vulnerable to program channel errors. That is, since the programming information is transmitted only once in a short time frame, if there are any problems with that transmission, such as a brief power failure at the subscriber's location, or adverse weather conditions such as a thunderstorm affecting the quality of the transmission, the subscriber's control unit may not be enabled. Conversely, if a "turn off" signal is not recorded in memory, a subscriber's control unit may remain enabled when it should be disabled. By repeating the subscriber programming information several times over a longer period, the likelihood of such errors may be reduced substantially.

SUMMARY OF THE INVENTION

The invention provides a unique method for subscription control which is applicable to one-way subscription television services, in general, and direct broadcast satellite television transmissions, in particular. The invention allows individual subscribers to subscribe to a variety of programs in advance and to select a pay-per-view program on impulse. In the former case, television programs can be marketed in terms of "program categories" either as individual programs or as packages of programs. Thus, a program category may constitute a single program such as a one-time only virtuoso performance or may be a plurality of programs such as a tennis tournament taking place over several days. In addition, the same programs can be marketed on a minute-by-minute basis with rates selectable by the broadcaster.

BRIEF DESCRIPTION OF THE DRAWING

The Drawing is a block diagram of a preferred embodiment of the subscriber control apparatus in accordance with the present invention.

DESCRIPTION OF THE PREFERRED EMBODIMENT

A non-volatile memory 10 is included in each subscriber's control unit 1. This non-volatile memory comprises either electrically erasable programmable read-only memory (EEPROM), electrically alterable programmable read-only memory (EAPROM), or CMOS random-access memory (RAM) with battery backup, as would be obvious to one having ordinary skill in the art.

The memory 10 is divided into two sections, 11 and 12, one of which is used to store the subscription information for the current billing period, while the other is used for subscription information for the next billing period. Thus, the broadcaster can update a memory section pertaining to a current billing period and send information to the other memory section in advance of a billing period. For purposes of illustration, memory section 11 associated with a logic "0" may be used to store information for even months while memory section 12 associated with a logic "1" may be used to store information for odd months. Each of these sections, 11 and 12, contains "n" bits.

The broadcaster transmits a Program Information Frame 20 along with each program. The Program Information Frame is time-division multiplexed with the audio portion of the programming audio on a single digital channel. This frame is repeated approximately seven or eight times a second. The Program Information Frame is removed prior to processing the digital audio signal in the digital audio decoder. The Program Information Frame is divided into a number of subframes. For the preferred embodiment shown in the Drawing, five subframes are used. Information signaling the end of a program is provided in subframe 22. Information identifying which section of memory 10 is to be read is provided in subframe 24. Memory number information in subframe 24 is simply a logic "0" or a logic "1". Assuming that "active high" memories are used, i.e., memories which are enabled by a logic "1", if it is desired to read information into memory section 11, a logic "0" is transmitted. Since active high memories are used, this signal must be inverted to a logic "1" to activate memory section 11. Inverter 30 changes the transmitted logic "0" to a logic "1" which allows memory section 11 to read the transmitted information. Since the transmitted signal also is passed on to memory section 12, it will not affect that section since the signal is not inverted and the transmitted logic "0" will not activate an active high memory. Similarly, if a logic "1" is transmitted in subframe 24, memory 12 will be activated while memory section 11 will not be activated because the logic "1" is inverted to a logic "0" which will not activate an active high memory.

Information associating a program number with the program then being transmitted is provided in subframe 26 as a number having "m" bits. Program categories are associated with unique program numbers. Each program number corresponds to a bit position in memory 10. The number of "viewing units" associated with that program is provided in subframe 28. Viewing units are the charges per minute of viewing time if a program is available on a pay-per-view basis, as will be discussed later.

Finally, one additional bit is provided in subframe 29. That bit determines if the pay-per-view mode of operation may be used for the current program. If this bit is a logic "0" then the pay-per-view mode can be activated. If this bit is a logic "1" then the pay-per-view mode cannot be activated, as will be discussed hereinbelow.

The broadcaster also transmits a Subscriber Information Frame 40. In a manner similar to the Program Information Frame, the Subscription Information Frame also is multiplexed with the programming audio on the digital channel. Several Subscriber Information Frames are transmitted each second to address a like number of subscription control units. As will be explained below, only the subscriber having an "address" corresponding to an address contained in the Subscriber Information Frame will be able to utilize the data intended for that subscriber. Again, the Subscriber Information Frame is removed prior to processing the digital audio signal in the digital audio decoder. The Subscriber Information Frame may be transmitted several times prior to the beginning of a new billing period to minimize the probability of a missed transmission or an error. The Subscription Information Frame may also be protected with forward error correction (FEC) coding and cyclic-redundancy check (CRC) to enhance reliability of the transmission.

This frame also consists of five subframes. In a manner similar to that explained with respect to subframe 24 and inverter 30, subframe 42 contains information identifying which section of memory 10 will receive the transmitted information. Here inverter 32 inverts the signal trasmitted in subframe 42 to insure that the Subscriber Table suframe 44 is written into the correct memory section. Subframe 44 includes information designating all of the program categories which have been selected by the subscriber, i.e., a Subscription Table of n bits where $n \leq 2^m$. Subframe 46 identifies how many preauthorized viewing units each subscriber has paid for in his account. Subframe 48 provides a "message number" which is used to determine if the Subscriber Information Frame has the most recent information regarding the number of preauthorized viewing units. Finally, subframe 49 contains a unique address for each subscriber.

Prior to the beginning of the transmission of each Program Information Frame, a unique word is transmitted which tells the subscriber control units to be ready to receive information. Each subscriber control unit is programmed to begin counting bits every time it receives a unique word. First, it will count a preselected number of bits, for example 128 bits, for the Program Information Frame. The control unit is programmed to "know" that a first number of bits will correspond to the End of Program subframe 22, a second number of bits will correspond to the Memory Number subframe 24, etc. The control unit will set a series of flip-flop corresponding to the presence of logic "1's" or logic "0's" in the Program Information Frame. The flip-flops are divided into fields and provide the binary information required for the operation of the invention. For example, the output of the field corresponding to the Program Number is read into memory 10. At the conclusion of the transmission of the Program Information Frame, the broadcaster transmits some preselected number of Subscriber Information Frames. The control unit again counts a preselected, sequential number of bits and sets a series of flip-flops. If the address in the Subscriber Address subframe 49 corresponds to the address of the control unit, and if the message number is higher than that previously received, the output of the flip-flops is used to write the Subscription Table into the memory 10 and to add pre-authorized viewing units to memory 70.

Sequentially, the first bit of memory sections 11 and 12 corresponds to program category number 1, and the $k^{th}$ bit address corresponds to program category number k. When a customer subscribes to the $k^{th}$ program category, for example, the $k^{th}$ bit position in the appropriate memory section is set to logic "1", otherwise, it is set to logic "0". The subscriber's control unit reads the Subscription Table periodically based on the Read Program No. signal provided by subframe 26 which serves as a "pointer" within the memory. If the value of the m-bit in the Read Program No. Signal is k, the unit checks the $k^{th}$ bit position in the Subscription Table for the current month. If this bit is set to logic "1", a logic "1" on memory output 13 is seen by OR gate 60 which enables the receiver. If this bit is set to logic "0", the OR gate sees a logic "0".

In addition to matching the Program Number with information in the Subscription Table to enable the receiver's control unit, the present invention also allows a pay-per-view mode of operation. In order to provide this mode, an additional non-volatile memory 70 is used in the subscriber's control unit. This memory stores the preauthorized viewing uits (PVU's). The implementation is slightly different depending upon whether the non-volatile memory uses EEPROM, EAPROM, or CMOS RAM with battery backup components as would be readily understood by those having ordinary skill in the art. With EEPROM or EAPROM implementations, for example, the non-volatile memory stores the preauthorized viewing units remaining when power is disconnected. A separate register 74 is used to store the viewing units remaining when the subscriber's control unit is enabled. This minimizes the number of writes in the EEPROM or EAPROM memories since these devices allow only a finite number of write cycles, typically on the order of 10,000. When power to the subscriber control unit is cut off, the power drop is detected and the contents of the register 74 are written into the EEPROM 72, which is shown only by way of example. When the power is applied, the control unit reads the contents of the EEPROM 72 and loads it back into the register 74.

The broadcaster transmits an l-bit number associated with the program being broadcast in subframe 28. This l-bit number refers to the viewing units (VU's) and corresponds to the amount to be charged each minute if the program is viewed on pay-per-view basis. The subscriber's control unit has a built-in-timer 80 which emits a pulse every minute. The subscriber can select a pay-per-view mode by pressing button 90 which allows the subscriber to initiate this mode if (a) the pay-per-view option is available as determined by subframe 29, and (b) the program is not presubscribed by the subscriber. If memory output 13 is a logic "1", OR gate 130 will stop timer 80 to prevent the subtraction of preauthorized viewing units from memory 70. This will preserve PVU's if the program has been subscribed. When pay-per-view viewing is initiated and timer 80 is not stopped by OR gate 130, the subscriber control unit deducts the amount of PVU's stored in register 74 by the amount of the VU's associated with every minute of the program. The subscriber is allowed to view programs in this mode as long as the amount in the register 74 is greater than a predefined value which is set in threshold control 100. The threshold value and the value of the number in the register are algebraically combined at adder 110. Logic element 120 provides a high signal to AND gate 121 if the output of the adder is above the threshold value and provides a low signal to OR gate 130 if the output is below the threshold value which, in turn, stops timer 80. If timer 80 is not disabled by OR gate 130, it will also provide a logic "1" to AND gate 121. This will insure that VU's are being deducted from PVU's paid for by the subscriber. When two logic "1's" are present at the input of AND gate 121, it will generate a logic "1" where OR gate 60 will see, resulting in the receiver being enabled.

If the CMOS RAM/battery backup implementation is used for memory 70 rather than the PROM implementation described above, the register is implemented directly in the CMOS RAM. The contents are initially cleared when power is supplied to the control unit. One drawback to this implementation, however, is that whenever the backup battery and the power are removed simultaneously, the subscriber may lose data pertaining to the number of pre-authorized viewing units for which he has prepaid.

As with the EEPROM, an amount equal to the viewing units is subtracted to algebraic adder 82 from the contents of the register 74 which stores the preauthorized viewing units whenever a pulse is received from the timer during pay-per-view viewing. Therefore, the register effectively holds the remaining preauthorized viewing units. For the l-bit VU's, the PVU's can be decremented at $2^l-1$ different rates. Thus, the charges for the program category can be quite diverse.

In addition to pay-per-view option being terminated if the program category was subscribed to and when the remaining PVU's fall below a threshold value, it may also be stopped in two other situations. First, the subscriber can activate switch 140 to send a signal to OR gate 130 which in turn will stop timer 80. Second, an end-of-program signal appearing in subframe 22 will also stop timer 80 by way of OR gate 130. The end of program signal is normally set to logic "0", indicating a program is in progress. At the end of the program, this bit is set to logic "1", indicating the end of the program. The purpose of this mechanism is to prevent the subscriber from unintentionally continuing the pay-per-view viewing option which could result in total depletion of the PVU's and eventual unfair charge. With the inclusion of the end-of-program signal, the subscriber must reinitiate pay-per-view viewing at the beginning of the next program in order to continue with pay-per-view viewing.

The proper amount of PVU's indicated in subframe 46 are credited to the subscriber's control unit after receipt of payment. This is accomplished by periodic over-the-air addressing. The subscriber may elect to pay for a certian amount of PVU's at the same time as presubscription selections are made at the beginning of the billing period. Alternatively, the subscriber may choose to purchase PVU's in the middle of a billing period. Yet another alternative is to purchase a number of PVU's at the beginning of the billing period and to purchase additional PVU's as desired during the billing period. Additional PVU's are added to the number in memory 70 at adder 150 provided gate 180 is opened as will be discussed hereinbelow. To simplify the hardware at the subscriber's side, the same presubscription table will also be transmitted with the additional PVU's. In other words, subscription information frame 40 will contain the same information with respect to subframe 42 and 44 but will be updated with respect to subframe 46.

To ensure the reliability of update message transmission, the system may use CRC codes for error detection. Since the same Subscriber Information Frame typically will be repeated several times, a message will not be accepted if the CRC does not check. To detect repeated messages and to prevent the subscriber control unit from adding PVU's repeatedly, a message number is attached to the update message. This message number comprises the contents of subframe 48. The message number is stored in another memory 160 each time the Subscription Table and the PVU subframes are updated. Upon reception of an update message, the subscription control unit will check the message number with the stored value at comparator 170. If the message number is the same as the stored value, the new message is simply a repeated transmission and is therefor discarded. Only if the message number is not the same is the message considered a new message requiring an update to the memory. In the event that message number comparator 170 detects a new message, it provides a signal to the gate-write enable means 190. Address comparator 200 determines if the subscriber information subframe 49 contains an address which matches that of the address contained in the subscriber control unit provided at address PROM 210. If the two addresses coincide, address comparator 200 provides a signal to gate/write enable 190. If the number in Message Number subframe 46 is greater than that previously received, another signal will be provided to gate/write enable 190 which will activate gate 180 and write enable 182 and 184. Gate 180 may be a simple semiconductor switch as would be well known in the art. It will also be understood that gate/write enable means 190 may take many forms depending on the desired implementation. For example, if this enabling means is in the form of an AND gate, logic "1" inputs from message number comparator 170 and address comparator 200 must be present to effect switching the function in gate 180 and write functions in write enable 182 and 184.

The major difference between the current invention and pay-per-view systems currently known is the present system's ability to operate reliably in a one-way broadcast channel. Known pay-per-view systems require a return channel either via a cable system or via the telephone system. The first approach is obviously unsuitable for DBS because of the cost of return link via satellite. The second approach requires a subscriber's set to have a telephone modem and access to the telephone system, which not only is prone to errors but also expensive. The current invention is also unique in the sense that both the presubscription and pay-per-view concepts are implemented in a single system with the option of operating in both modes or in one of the two modes exclusively. To market a program exclusively on a presubscription basis, a "pay-per-view permitted" bit which is transmitted periodically with the program number in subframe 29, is set to logic "0". To market a program exclusively on a pay-per-view basis, the program number can be set to zero. This will be interpreted by the subscriber's control unit as indicating that the subscriber has not subscribed to this program. The current invention is also very flexible in terms of the way each individual program is marketed. As mentioned before, programs can be charged at $2^l-1$ different rates on a pay-per-view basis. In addition, a reasonable size of subscription table, for example 128 bits for each of the two memories, would allow the broadcaster to market the programs in 128 different categories in any of the $2^{128}$ combinations.

Although the invention has been described and shown in terms of a preferred embodiment thereof, it will be understood by those skilled in the art that changes in form and detail may be made therein without departing from the spirit and scope of the invention.

Having described the invention, we claim:

1. A method for one-way program subscription control for a plurality of program subscribers, each having a subscriber address, comprising the steps of:
    coding program identification information, including first memory address, program rate, and unique program number, according to preselected program characteristics;
    concurrently transmitting said coded program identification information, repeated on a first periodic basis which period is substantially less than the duration of said coded program, and programming having said program characteristics to all program subscribers;
    receiving and reading into a subscription table memory, being located at every subscriber address and being adapted to store an identification code for each progam, said coded program identification information;
    coding individual program subscription information for each subscriber address, including second memory address, presubscribed program and credit information, according to programming selections made by such subscriber;
    transmitting said program subscription information to all subscribers on a second periodic basis which period is substantially greater than the duration of said coded program;
    receiving and writing said program subscription information into said subscription table memory at each subscriber address which corresponds to that subscriber address coded with said program subscription information being transmitted at a given time;
    comparing said program identification information which has been read into said subscription table memory with said program subscription information which has been written in said subscription table memory;
    enabling individual subscriber program receivers so that each said subscriber is able to receive programming then being transmitted in response to correspondence of said program subscription information and said program identification information, and decrementing said credit information stored in said subscription table memory on said first periodic basis when said comparison program identification information and said program subscription information results in said receiver being enabled.

2. The method of claim 1, wherein the step for coding individual program subscription information comprises the further step of identifying a program category or categories defined in terms of program numbers, said category or categories being selected by an individual subscriber.

3. The method of claim 1, wherein the step of coding program identification information with program costs comprises characterizing a program with a number of viewing units per unit of viewing time for use with a pay-per-view option; the step of coding program subscription information comprising the further step of identifying a number of preauthorized viewing units available for each subscriber; the step of adding to a preauthorized viewing unit memory the number of preauthorized viewing units represented in said program subscription information; and, the step of subtracting viewing units from said preauthorized viewing unit memory as each viewing unit is used by each said subscriber.

4. The method of claim 3 further comprising the step of selectively disabling the step of writing into each subscriber's subscription table memory and the step of adding to each subscriber's preauthorized unit memory, when said program subscription information received is identical to that previously received by said subscriber.

5. The method of claim 1 wherein the step of coding program identification information further comprises the step characterizing a program with a pay-per-view signal making a pay-per-view option available for the programming then being transmitted.

6. The method of claim 3 further comprising the step of disabling an individual subscriber's program receiver when the number of preauthorized viewing units remaining in said subscriber's preauthorized viewing unit memory does not meet a predetermined threshold value.

7. The method of claim 1, wherein the step of coding the program identification information further comprises the step of providing an end-of-program signal.

8. The method of claim 5 further comprising the step of disabling an individual subscriber's program receiver upon reception of an end-of-program signal.

9. Apparatus for one-way program subscription control of a plurality of subscribers wherein each subscriber has a control unit associated with a programming receiver, each said control unit comprising:
    subscription memory means;
    preauthorized viewing unit memory means;
    first means for reading and writing on a first periodic basis transmitted coded information representing programming selections presubscribed on an individual program basis for each said subscriber into said subscription memory means;

second means for reading coded information representing programming that concurrently is being transmitted on a second periodic basis;

third means connected to said second means and said subscription memory means for determining if the identity of said programming being transmitted corresponds to presubscribed programming selections and generating an output signal if correspondence exists;

fourth means for enabling a programming receiver in response to said output signal;

fifth means for reading and writing on a second periodic basis transmitted coded information representing a number of preauthorized viewing units for each said subscriber into said preauthorized viewing unit memory means;

clock means for counting the number of viewing units used by said subscriber;

sixth means for algebraically adding the number of viewing units used with the number of preauthorized viewing units stored in the viewing unit memory means to determine the number of preauthorized viewing units remaining;

seventh means for updating the preauthorized viewing unit memory means so that the number of preauthorized viewing units available are set equal to the number of preauthorized viewing units remaining;

eighth means for comparing the number of preauthorized viewing units remaining with a predetermined threshold value; and ninth means for enabling the program timing receiver responsive to said means for comparing so that said each subscriber is able to receive programming on a pay-per-view basis even if said programming selection has not been subscribed to by said each subscriber provided the number of preauthorized viewing units exceeds said predetermined threshold value.

10. The apparatus of claim 9, wherein the clock means may be disabled by an end-of-program signal.

11. The apparatus of claim 9, wherein the clock means may be disabled by a manual switch.

12. The apparatus of claim 9, wherein the clock means may be disabled in response to the number of preauthorized viewing units falling below a predetermined threshold value.

13. The apparatus of claim 9 further comprising means for updating said subscription memory means and said viewing unit memory means only when said coded information, representing presubscribed programming and said coded information representing preauthorized viewing units, changes with respect to information previously received.

14. The apparatus of claim 13, wherein the means for updating includes means for transmitting a message number associated with said coded information representing presubscribed programming and said coded information representing preassigned viewing units;
means for storing a message number received by said control unit;
means for comparing said stored message number with a subsequently received message number, and
means for generating an update enabling signal when said message numbers are different.

15. The apparatus of claim 9 wherein said viewing unit memory means comprises a register in combination with an EEPROM.

16. The apparatus of claim 9, wherein said viewing unit memory comprises a register in combination with an EAPROM.

17. The apparatus of claim 9 wherein said viewing unit memory comprises a register in combination with a CMOS RAM with a back-up battery.

* * * * *